United States Patent [19]

Quackenbush et al.

[11] 4,127,415
[45] Nov. 28, 1978

[54] ALUMINUM BOROPHOSPHATE GLASS COMPOSITIONS

[75] Inventors: Carr L. W. Quackenbush, Lexington; Andrew G. Kolbeck, Beverly; Richard M. Klein, Framingham, all of Mass.

[73] Assignee: GTE Laboratories Incorporated, Waltham, Mass.

[21] Appl. No.: 773,525

[22] Filed: Mar. 2, 1977

[51] Int. Cl.$^2$ .................... C03C 3/14; C03C 3/16; C03C 3/28

[52] U.S. Cl. .................... 106/47 R; 106/47 Q; 106/54; 252/301.4 P

[58] Field of Search .................... 106/47 R, 47 Q, 54; 252/301.4 P

[56] References Cited

U.S. PATENT DOCUMENTS

| | | | |
|---|---|---|---|
| 1,964,629 | 6/1934 | Grimm | 106/47 R |
| 2,486,812 | 11/1949 | Weyl | 106/47 R |
| 3,248,234 | 4/1966 | Godron | 106/47 R |

OTHER PUBLICATIONS

Volf-*Technical Glasses*, pp. 401–402, SNTL Publishers, Prague and Sir Isaac Pitman, London (1961).

*Primary Examiner*—O. R. Vertiz
*Assistant Examiner*—Mark Bell
*Attorney, Agent, or Firm*—David M. Keay

[57] ABSTRACT

Novel glass compositions are provided which are enclosed by the iso-composition lines, 2 and 18 mole percent $P_2O_5$, 30 and 70 mole percent $Al_2O_3$ and 20 and 60 mole percent $B_2O_3$. The compositions can contain the usual oxide modifiers. These composition are characterized by refractive indices between about 1.47 and 1.58, densities between about 2.1 and 2.7 gm/cm$^3$, thermal expansion coefficients between about $26 \times 17^{-7}/C°$ and $55 \times 10^{-7}/C°$, and glass transition points of between about 600 and 820° C.

4 Claims, No Drawings ical insulators and optical components. The glass compositions are prepared by blending and sometimes calcining sources of $Al_2O_3$, $P_2O_5$ and $B_2O_3$ in a crucible such as platinum or alumina. The concentration of reactants employed is such as to obtain a glass composition within the ranges set forth above taking into account vaporization losses during heating. The reactants are heated to their melting temperatures, usually between about 1450° C. and 1800° C. to obtain a melt which is cooled to form the glass.

ALUMINUM BOROPHOSPHATE GLASS COMPOSITIONS

BACKGROUND OF THE INVENTION

This invention relates to novel glass compositions formed from oxides of aluminum, boron and phosphorous.

A large number of oxide systems, particularly those including silicon have been utilized to form glass compositions. As is well known, glasses exhibit a wide variety of physical characteristics including optical properties, electrical properties, chemical properties, solubility for modifiers and heat stability which enables the practitioner to choose a particular glass to fit his needs. Usually, glass compositions have limited desirable physical characteristics so that the practioner must provide some means for ameliorating the poor physical properties of the composition in order to take advantage of the desired properties which the glass composition provides. For example, most silicate glasses which have relatively high annealing temperatures also generally have low thermal expansion coefficients.

Aluminum borophosphate glass compositions are known in the art. For example, U.S. Pat. No. 3,519,445 discloses an aluminum borophosphate glass-ceramic composition which is disclosed to contain 50 to 80 weight percent $P_2O_5$. The composition is formed in open silica crucibles at 1500°-1650° C. and therefore contains silica in the composition which is derived from the crucible. Volf in *Technical Glasses*, pages 401-402, SNTL Publishers, Prague and Sir Isaac Pitman, London (1961) discloses aluminum borophosphate glasses containing 10 to 30 mole percent of mixtures of alkali or alkaline earth modifiers which are required for homogeneous glasses. Dale et al., J. Soc. Glass Technology, Vol. 35, pages 185-192 (1952) disclose aluminum borophosphate glasses containing low concentrations of $P_2O_5$ and containing up to about 30 mole percent of mixture of alkaline earth modifiers, e.g. MgO and CaO which are required to form homogeneous glasses.

It would be desirable to provide glass compositions which provide a wide variety of desirable physical properties. Furthermore, it would be desirable to provide such glass compositions to which can be added modifiers to improve a desired physical characteristic of the glass without degrading other physical characteristics of the glass.

SUMMARY OF THE INVENTION

This invention provides novel ternary glass compositions enclosed by the iso-compositions lines, 2 and 18 mole percent $P_2O_5$, 30 and 70 mole percent $Al_2O_3$ and 20 and 60 mole percent $B_2O_3$. The glasses can be modified, if desired by the addition of a wide variety of oxides with the modifier levels allowable being dependent upon the specific modifier composition being added. The glass compositions are characterized by high electrical resistivities, refractive indices of about 1.5 coupled with low optical dispersion, high ultraviolet transparency, high solubility for rare earths, high glass transition temperatures, good solarization resistance and relatively constant thermal expansion coefficients over both a range of refractive indices and glass transition temperatures. The combination of good physical characteristics of these glasses permit their use in large numbers of commercial applications, such as in discharge lamps with luminescent glass envelopes, optical fibers,

DESCRIPTION OF SPECIFIC EMBODIMENTS

The aluminum borophosphate glasses of this invention are formed in a manner so that vaporization of the glass forming constituents, particularly $P_2O_5$ is controlled. Materials which are sources of $Al_2O_3$, $B_2O_3$ and $P_2O_5$ are blended, calcined if desired and preferably melted in a crucible which does not dissolve in the glass composition or the precursor of the glass composition. Normal melting temperatures range between about 1450° C. and 1800° C., preferably between about 1500° C. and 1650° C., depending upon the specific glass composition being formed. Normal seed-free firing time is between about 0.25 and 4.0 hours, preferably between about 1.0 and 2.0 hours. It is preferred to maintain minimum firing times in order to reduce vaporization of the glass-forming constituents. Representative suitable crucible materials include platinum, platinum/rhodium alloys and aluminum oxide.

Since $P_2O_5$ is the most volatile glass-forming constituent, it can be added in concentrations in excess of the desired final concentration in the glass composition. Alternatively and preferably, the $P_2O_5$ is added to the crucible in the form of a refractory compound such as $AlPO_4$, $BPO_4$, $AlP_3O_9$, or refractory modifying cation phosphates such as $Mg_2P_2O_7$, $Ca_3(PO_4)_2$, $ZrP_2O_7$ or the like. By adding $P_2O_5$ as a refractory compound, improved control of the final glass composition is attained. After substantially complete reaction of the reactants is obtained in the melt, it is cooled in any conventional manner such as by air cooling or by cooling between steel plates to obtain the final amorphous glass composition.

As set forth above, the glass compositions contain from 2 to 18 mole percent $P_2O_5$, from 30 to 70 mole percent $Al_2O_3$ and from 20 to 60 mole percent $B_2O_3$. In addition, the ternary glass composition can contain oxide modifiers including $SiO_2$, MgO, CaO, $TiO_2$, $ZrO_2$, $Na_2O$, CdO, ZnO, $SnO_2$, $Tb_2O_3$, $Eu_2O_3$, $Nd_2O_3$, $CeO_2$ and the like. The rare earth oxides particularly $Tb_2O_3$, $Eu_2O_3$, $Nd_2O_3$ or the like are employed in concentrations up to about 35 weight percent based upon the weight of the ternary glass composition in order to vary the fluorescent output. Zirconia is employed in concentrations of between about 5 and 20 mole percent based upon the ternary glass composition in order to vary glass transition temperature. Silica in concentrations up to about 40 mole percent provides increased resistance to devitrification of the aluminum borophosphate glasses. In a similar way other specific modifiers or combinations of modifiers can be used to effect other changes in glass properties.

Representative sources of $P_2O_5$ are $AlPO_4$, $BPO_4$, $AlP_2O_9$ or refractory modifying cation sources such as $Mg_2P_2O_7$, $Ca_3(PO_4)_2$ or $ZrP_2O_7$. Representative sources of $Al_2O_3$ are $Al_2O_3$, $AlPO_4$, $AlP_3O_9$ and modifying cation aluminates such as $MgAl_2O_4$. Representative sources of $B_2O_3$ are $BPO_4$, $B_2O_3$ or modifying cation borates such as $Mg_3B_2O_6$.

The glass compositions of this invention are stable against degradation by water as are the conventional multicomponent soda-lime silicate glasses even though both $B_2O_3$ and $P_2O_5$ in their pure states are strongly deliquescent. In addition to those properties of aluminum borophosphate glasses which are broadly similar to conventional silicate materials, there are other properties of the new glasses which are unusual. An important example is their refractory characteristics. For instance, the glass transition temperature, ($T_g$ which is about equal to the annealing temperature and is a measure of the approximate upper use temperature) for many compositions in the aluminum borophosphate system can be in the range of 700°–820° C. For compositions in the high alumina corner of the disclosed glass-forming region (e.g. 65m% $Al_2O_3$-11 $P_2O_5$-24 $B_2O_3$) $T_g$ is about 815° C. In addition, it has been found that for selected compositions additions of $ZrO_2$ (ca 5–10m%) can increase $T_g$ by up to 100° C. For comparison, most conventional silicate glasses have annealing temperatures substantially lower than the new glasses; the exceptions are aluminosilicate glasses for which $T_g$ has about the same range as the aluminum borophosphates, and fused silica, for which $T_g$ is 1000°–1100° C. The aluminum borophosphate glasses also have high electrical reisitivities, with values at 250° C. of over $10^{15}$ ohm cm. The only previously known glasses having comparable resistivities are the calcium boroaluminates where values at 250° C. of up to $10^{16}$ ohm cm have been reported. The optical properties of the aluminum borophosphate glasses are also unusual. Resistance to solarization by x-rays is good in comparison with soda-lime-silica glass. The average decrease in transmission between solarized and unsolarized samples over the wavelength range 300–700 nm is 16% for the aluminum borophosphate glass and 30% for soda-lime glass. Refractive index ranges between 1.47 and 1.58 with optical dispersion, given as the $v$-value, between 48 and 71 (where a high $v$-value represents a low optical dispersion). Because most silicates have higher refractive indices and smaller $v$-value (i.e. higher dispersions), the ranges for these two parameters place the new glasses in an advantageous position for optical applications. The ultraviolet cutoff of certain compositions in the aluminum borophosphate system occurs at about 190nm provided that special preparation techniques are used to ensure that low impurity levels are maintained. Thus, the new glasses are more transparent at ultraviolet wavelengths than any conventional glasses except fused silica. This feature, coupled with an observed high solubility for rare earth modifiers (which fused silica does not display) and their good solarization resistance, is particularly favorable for luminescent and discharge lamp applications. The aluminum borophosphate glasses also show unusual capabilities for independent property control. For instance, the isoproperty contour lines for refractive index and thermal expansion coefficient are not parallel in a large area of the low phosphate glass-forming region. This means, for example, that refractive index can be adjusted while retaining a constant thermal expansion coefficient, which is a particularly favorable feature for applications such as optical fibers. The glasses of this invention have refractive indices between 1.47 and 1.58, densities between 2.1 and 2.7 gm/cm$^3$ and thermal expansion coefficients between about 26 and 55 $\times 10^{-7}/°$ C.

The following examples illustrate the present invention and are not intended to limit the same:

EXAMPLE I

This example illustrates the method of making the aluminum borophosphate glasses of this invention.

The glass compositions as shown in Table I, glass compositions of varying $P_2O_5$, $Al_2O_3$ and $B_2O_3$ content, were made from the reactants shown. The difference between the relative concentrations of the $P_2O_5$, $Al_2O_3$ and $B_2O_3$ in the reactants and the final compositions is due to vaporization losses or solution of alumina from the crucible wall.

The reactants were weighed and blended and melted in a platinum or aluminum oxide crucible at the temperatures and for the times shown in Table I. In some instances, the reactants were calcined between 300° and 950° C.

TABLE I

| Glass Compositions | Batch Composition (mole %) | | | Batch Oxides used | Crucible Material | Melting Temp. (° C) | Melting Time (hr.) | Analyzed Glass Composition (mole %) | | |
|---|---|---|---|---|---|---|---|---|---|---|
| | $Al_2O_3$ | $P_2O_5$ | $B_2O_3$ | | | | | $Al_2O_3$ | $P_2O_5$ | $B_2O_3$ |
| 1 | 31.4 | 16.1 | 52.5 | $Al_2O_3$, $B_2O_3$, $AlPO_4$ | Pt | 1610 | 2 | 33.6 | 16.1 | 50.3 |
| 2 | 34.3 | 9.2 | 56.5 | $Al_2O_3$, $B_2O_3$, $AlPO_4$ | Pt | 1610 | 2 | 35.4 | 10.4 | 54.2 |
| 3 | 38.1 | 6.1 | 55.8 | $Al_2O_3$, $B_2O_3$, $AlPO_4$ | Pt | 1610 | 2 | 40.2 | 4.2 | 55.6 |
| 4 | 35.0 | 13.0 | 52.0 | $Al_2O_3$, $B_2O_3$, $BPO_4$ | Pt | 1600 | 2 | 39.3 | 13.2 | 47.5 |
| 5 | 39.6 | 10.1 | 50.3 | $Al_2O_3$, $B_2O_3$, $AlP_3O_9$ | Pt | 1600 | 2 | 42.8 | 10.4 | 46.8 |
| 6 | 38.0 | 10.0 | 52.0 | $Al_2O_3$, $B_2O_3$, $BPO_4$ | Pt | 1605 | 2 | 46.6 | 7.0 | 46.4 |
| 7 | 42.1 | 16.8 | 41.1 | $Al_2O_3$, $B_2O_3$, $AlPO_4$ | Pt | 1610 | 2 | 47.2 | 16.0 | 36.8 |
| 8 | 44.7 | 15.0 | 40.3 | $Al_2O_3$, $B_2O_3$, $BPO_4$ | Pt | 1605 | 2 | 52.2 | 12.3 | 35.5 |
| 9 | 48.5 | 6.3 | 45.2 | $Al_2O_3$, $B_2O_3$, $BPO_4$ | Pt/.4 Rh | 1755 | 0.5 | 53.0 | 8.9 | 38.1 |
| 10 | 37.9 | 20.4 | 41.7 | $Al_2O_3$, $B_2O_3$, $AlPO_4$ | $Al_2O_3$ | 1700 | 0.5 | 62.9 | 15.9 | 21.2 |

The glass compositions set forth in Table I were determined to have the properties shown in Table II.

TABLE II

| Glass Compositions | Glass Transition Temperature $T_g$ (° C) | Refractive Index | Optical Dispersion ($v$-number) | Density (g/cm$^3$) | Thermal Expansion Coefficient ($\times 10^{-7}/°$ C) |
|---|---|---|---|---|---|
| 1 | 630 | 1.475 | 61 | 2.145 | 36 |
| 2 | 635 | 1.503 | 63 | 2.280 | 40 |
| 3 | 665 | 1.532 | 50 | 2.394 | 42 |
| 4 | 635 | 1.506 | 58 | 2.320 | 37 |
| 5 | 655 | 1.532 | 63 | 2.392 | 42 |
| 6 | 660 | 1.528 | 64 | 2.416 | 40 |
| 7 | 665 | 1.512 | 64 | 2.358 | 27 |

TABLE II-continued

| Glass Compositions | Glass Transition Temperature $T_g$ (° C) | Refractive Index | Optical Dispersion ($\nu$-number) | Density (g/cm$^3$) | Thermal Expansion Coefficient ($\times 10^{-7}$/° C) |
|---|---|---|---|---|---|
| 8 | 680 | 1.530 | 62 | 2.458 | 38 |
| 9 | 745 | 1.573 | — | 2.623 | 53 |
| 10 | 765 | 1.541 | — | 2.561 | 36 |

EXAMPLE II

This example illustrates the method of making the aluminum borophosphate glasses of this invention containing oxide modifiers.

The modified glass compositions were made by the method described in Example I except that they include modifying oxides. The reactants, modifiers, melt temperature and time of heating are shown in Table III.

TABLE III

| Glass Composition | Base Glass Batch Composition (Mole %) | | | Modifier (Mole %) | Batch Oxides used in Base Glass | Melting Temp. (° C) | Melting Time (hrs.) | Analyzed Glass Composition (Mole %) | | | Modifier |
|---|---|---|---|---|---|---|---|---|---|---|---|
| | Al$_2$O$_3$ | P$_2$O$_5$ | B$_2$O$_3$ | | | | | Al$_2$O$_3$ | P$_2$O$_5$ | B$_2$O$_3$ | |
| 11 | 42.9 | 14.3 | 38.1 | 4.7-SiO$_2$ | Al$_2$O$_3$, B$_2$O$_3$, BPO$_4$ | 1600 | 1.5 | 47.7 | 13.7 | 34.4 | 4.2-SiO$_2$ |
| 12 | 42.8 | 14.3 | 37.9 | 5.0-ZrO$_2$ | Al$_2$O$_3$, B$_2$O$_3$, AlPO$_4$ | 1600 | 1 | 42.0 | 17.7 | 35.2 | 5.1-ZrO$_2$ |
| 13 | 34.0 | 8.5 | 42.5 | 15.0-ZrO$_2$ | Al$_2$O$_3$, B$_2$O$_3$, AlPO$_4$ | 1590 | 1 | 38.1 | 8.4 | 37.4 | 16.1-ZrO$_2$ |
| 14 | 27.1 | 9.0 | 24.0 | 39.9-MgO | Al$_2$O$_3$, B$_2$O$_3$, BPO$_4$ | 1610 | 2 | 29.9 | 8.7 | 22.4 | 39.0-MgO |
| 15 | 38.1 | 9.5 | 47.5 | 5.0-MgO | Al$_2$O$_3$, B$_2$O$_3$, BPO$_4$ | 1610 | 2 | 41.1 | 10.1 | 43.5 | 5.3-MgO |
| 16 | 24.0 | 6.0 | 30.0 | 40.0-CdO | Al$_2$O$_3$, B$_2$O$_3$, BPO$_4$ | 1620 | 2 | 36.7 | 7.0 | 25.6 | 30.7-CdO |
| 17 | 24.1 | 6.0 | 30.1 | 39.8-ZnO | Al$_2$O$_3$, B$_2$O$_3$, BPO$_4$ | 1610 | 1.5 | 24.7 | 9.2 | 27.2 | 38.9-ZnO |
| 18 | 38.1 | 9.5 | 47.5 | 4.9-SnO$_2$ | Al$_2$O$_3$, B$_2$O$_3$, BPO$_4$ | 1615 | 2 | 42.9 | 10.3 | 43.4 | 3.3-SnO$_2$ |
| 19 | 38.1 | 9.5 | 47.5 | 5.0-Na$_2$CO$_3$ | Al$_2$O$_3$, B$_2$O$_3$, BPO$_4$ | 1600 | 1 | 39.9 | 10.6 | 42.3 | 7.3-Na$_2$O |
| 20 | 32.2 | 8.0 | 40.1 | 19.7-Na$_2$CO$_3$ | Al$_2$O$_3$, B$_2$O$_3$, BPO$_4$ | 1600 | 1 | 36.4 | 7.6 | 34.5 | 21.4-Na$_2$O |

The glass compositions set forth in Table III were determined to have the properties set forth in Table IV.

TABLE IV

| Glass Composition | Glass Transition Temperature $T_g$ (° C) | Resistivity (ohm-cm) at 25° C | Refractive Index | Optical Dispersion ($\nu$-number) | Density (g/cm$^3$) | Thermal Expansion Coefficient ($\times 10^{-7}$/° C) |
|---|---|---|---|---|---|---|
| 11 | 710 | — | 1.532 | 62 | 2.456 | 37 |
| 12 | 680 | — | 1.542 | 60 | 2.525 | 36 |
| 13 | 705 | — | 1.601 | 53 | 2.791 | 42 |
| 14 | 695 | — | 1.544 | 65 | 2.534 | 44 |
| 15 | 670 | — | 1.541 | 62 | 2.462 | 44 |
| 16 | 635 | — | 1.594 | 32 | 3.219 | 51 |
| 17 | 620 | — | 1.615 | 41 | 3.182 | 48 |
| 18 | 675 | — | 1.548 | 53 | 2.544 | 42 |
| 19 | 615 | $3 \times 10^{19}$ | 1.523 | 61 | 2.399 | 48 |
| 20 | 495 | $2 \times 10^{13}$ | 1.515 | 70 | 2.405 | 75 |

We claim:

1. An aluminum borophosphate glass composition comprising 2 to 18 mole percent P$_2$O$_5$, 30 to 70 mole percent Al$_2$O$_3$ and 20 to 60 mole percent B$_2$O$_3$.

2. An aluminum borophosphate glass composition of from 2 to 18 mole percent P$_2$O$_5$, 30 to 70 mole percent Al$_2$O$_3$, and 20 to 60 mole percent B$_2$O$_3$; further containing up to about 35 weight percent of a rare earth oxide, said percent of a rare earth oxide based upon the weight of said aluminum borophosphate glass.

3. An aluminum borophosphate glass composition of from 2 to 18 mole percent P$_2$O$_5$, 30 to 70 mole percent Al$_2$O$_3$, and 20 to 60 mole percent B$_2$O$_3$; further containing up to 20 mole percent ZrO$_2$, said percent ZrO$_2$ based upon the total glass composition, said glass composition being characterized by increased glass transition temperature.

4. The glass composition of claim 2 wherein said rare earth oxide is selected from the group consisting of neodymium oxide, terbium oxide, and europium oxide.

* * * * *